UNITED STATES PATENT OFFICE.

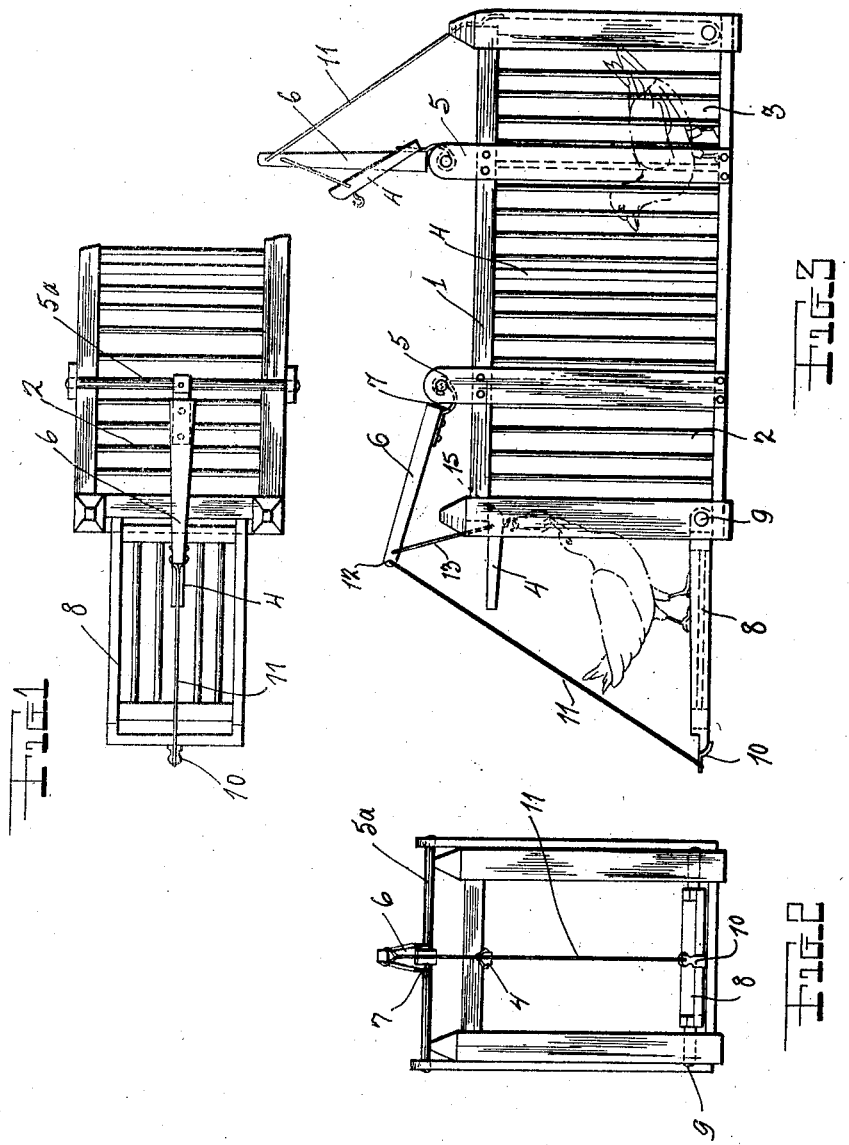

JOZEF GORNIAK, OF DENVER, COLORADO.

BIRD-TRAP.

1,384,610.     Specification of Letters Patent.     Patented July 12, 1921.

Application filed January 22, 1921. Serial No. 439,180.

*To all whom it may concern:*

Be it known that I, JOZEF GORNIAK, a citizen of the United States, residing at Denver, in the county of Denver and State of Colorado, have invented certain new and useful Improvements in Bird-Traps, of which the following is a specification.

The main object of this invention is to provide a secure and quick-acting bird trap, which will assure the safe entrapping of birds without injury to the birds.

The above and other objects will become apparent in the description below, in which like-named characters of reference refer to like-named parts in the drawings.

Referring briefly to the drawings, Figure 1 is a plan view of one-half of my trap.

Fig. 2 is a front elevational view of the same.

Fig. 3 is a side elevational view of my complete trap.

Referring now in detail to the drawings, the numeral 1 represents a cage having two compartments, 2 and 3, similar in every respect, and equipped with similar entrapping means. For this reason only one side of the trap will be described. Said compartments are separated by a wall 4.

Uprights 5 are supported on the sides of the cage, and a rod 5ª extends between the upper ends of said uprights. One end of a band spring 7 is rigidly attached to said rod, and the other end is attached to a lever 6, the tension of said spring being such as to normally urge said lever in a clockwise direction. A platform 8 is rotatably attached at 9 at the entrance to the compartment, and an eyelet 10 is secured at the free end thereof. A cord 11 connects said eyelet with the end 12 of the lever 6.

A member 4 has a cord 13 passing through one end thereof, said cord being also attached to the end 12 of the lever 6. The edge 15 of the member 4 is retained against the roof of the cage by force of the cord 13 and weight of a bait 16 hung under the edge 15. The location of the point at which the cord 13 passes through the member 4 is such that a balance is obtained between the weight of the bait and the tension of the cord 13 which causes the member 4 to retain the horizontal position shown. However, when a bird tugs upon the bait 16, the balance will be disturbed, the member 4 will turn slightly at first in a clock-wise direction, and then, as the full force of the spring comes into play upon the member 6 and hence cords 11 and 13, the platform 8 will be suddenly and sharply rotated against the cage, closing the entrance and precipitating the bird inside. The cage will then be closed as shown on the right side of Fig. 3.

Thus I have provided a quick-acting and reliable bird trap which will successfully entrap any bird attracted by the bait, and will not injure the bird thereby.

I claim:

1. A device of the class described comprising a cage, a platform pivotally attached at the entrance to said cage, uprights on the sides of said cage, a rod supported between said uprights, a spring rigid with said rod and extending outward therefrom, a rigid member attached to the free end of said spring, a second member having a hole therethrough near one end thereof, a cord passing through said hole and having means at the end thereof for attaching bait thereto, said cord being attached at the other end to said first member, and a cord connecting the end of said platform with said first-member.

2. A device of the class described comprising a cage, a platform rotatably attached at the entrance to said cage, uprights on the sides of said cage, a rod supported between said uprights, a spring rigid with said rod, a member rigid with the free end of said spring, a cord connecting said member with the end of said platform, means for holding bait, and means actuable by said first-named means to precipitately rotate said platform against said cage upon disturbance of said first-named means.

In witness whereof I affix my signature.

JOZEF GORNIAK.

Witness:

ANDY $\times$ KONECKI.
     his
     mark